United States Patent
Larghi et al.

(12) 
(10) Patent No.: US 9,744,633 B2
(45) Date of Patent: Aug. 29, 2017

(54) GRIP DEVICE FOR LOCKING CYLINDRICAL METALLIC BODIES TO BE MACHINED BY MEANS OF MACHINE TOOLS

(71) Applicant: SPL SOLUZIONI S.R.L., Treviolo (IT)

(72) Inventors: Carlo Larghi, Abbadia Lariana (IT); Carlo Pisoni, Tremosine (IT)

(73) Assignee: SPL SOLUZIONI S.R.L., Treviolo (IT)

( * ) Notice: Subject to any disclaimer, the term of this patent is extended or adjusted under 35 U.S.C. 154(b) by 576 days.

(21) Appl. No.: 14/367,701

(22) PCT Filed: Dec. 19, 2012

(86) PCT No.: PCT/IB2012/057481
§ 371 (c)(1),
(2) Date: Jun. 20, 2014

(87) PCT Pub. No.: WO2013/093801
PCT Pub. Date: Jun. 27, 2013

(65) Prior Publication Data
US 2015/0013426 A1    Jan. 15, 2015

(30) Foreign Application Priority Data

Dec. 22, 2011   (IT) .............. VR2011A0229

(51) Int. Cl.
*B21D 43/05* (2006.01)
*B23Q 3/06* (2006.01)
*B21D 51/26* (2006.01)

(52) U.S. Cl.
CPC ............. *B23Q 3/065* (2013.01); *B21D 43/05* (2013.01); *B21D 51/2615* (2013.01); *B21D 51/2692* (2013.01)

(58) Field of Classification Search
CPC .... B23Q 3/065; B21D 51/2615; B21D 51/26; B21D 51/2692; B21D 43/05
(Continued)

(56) References Cited

U.S. PATENT DOCUMENTS 6,237,388 B1 *   5/2001   McClung ............... B21D 43/05
                                                        248/363
7,631,529 B2 *  12/2009   Frattini .............. B21D 51/2692
                                                         72/125

(Continued)

FOREIGN PATENT DOCUMENTS

EP          2364792 A1      9/2011
JP          9019731 A       1/1997
(Continued)

OTHER PUBLICATIONS

International Search Report (PCT/ISA/210) for PCT/IB2012/057481 mailed Mar. 7, 2013 and Written Opinion of the International Searching Authority (PCT/ISA/237).

(Continued)

*Primary Examiner* — David B Jones
(74) *Attorney, Agent, or Firm* — Koppel, Patrick, Heybl & Philpott

(57) ABSTRACT

A grip device for locking metallic bodies destined for machining by means of machine tools, comprising at least one accommodation body for the bottom of a cylindrical container, the accommodation body being supported by a table that can move with respect to a supporting frame, the accommodation body accommodating an annular membrane that has at least one portion which can be deformed in a radial direction, the annular membrane being associated, on opposite sides with respect to the deformable portion, with a respective presser body, an actuator being provided which is adapted to move the presser bodies on command mutually closer and apart; the actuation elements comprise mechani- (Continued)

cal elements for kinematic transmission which can be operated following the relative movement of the movable table with respect to the supporting frame.

9 Claims, 4 Drawing Sheets

(58) Field of Classification Search
USPC .......................................................... 72/422
See application file for complete search history.

(56) References Cited

U.S. PATENT DOCUMENTS

| | | | | |
|---|---|---|---|---|
| 8,336,363 B2 * | 12/2012 | Frattini | ................. | B21D 51/26 |
| | | | | 72/422 |
| 9,364,938 B2 * | 6/2016 | Dunwoody | ............ | B21D 51/26 |

FOREIGN PATENT DOCUMENTS

| WO | WO 2006/069609 | 7/2006 |
|---|---|---|
| WO | WO 2008/152661 | 12/2008 |

OTHER PUBLICATIONS

Italian Search Report for Italian Patent Application No. IT VR20110229 dated Mar. 28, 2012.

\* cited by examiner

GRIP DEVICE FOR LOCKING CYLINDRICAL METALLIC BODIES TO BE MACHINED BY MEANS OF MACHINE TOOLS

The present invention relates to a grip device for locking cylindrical metallic bodies, constituted for example by cans of the aerosol type, destined for machining by means of machine tools.

Machines for machining containers, typically made of aluminum or steel and constituted by blanks having a cylindrical cross-section obtained by extrusion or drawing and having, at a longitudinal end, a bottom wall and, at the opposite end, a free rim on which a flaring operation is to be performed to provide for example a mouth adapted to be associated with a dispensing valve, are known.

Usually, cylindrical blanks having a cylindrical cross-section are fed, by means of a feeding device known per se, to the machine tool, which is constituted for example by a flaring machine, which has a table that rotates with an intermittent motion and is provided, at its peripheral region, with grip elements that are mutually angularly spaced about the rotation axis of the rotating table and are designed to lock temporarily the blanks to be machined; the machine tool furthermore has a machining assembly that is normally constituted by a plate that is arranged opposite the rotating table and supports a plurality of machining spindles designed to perform in sequence the various machining operations on the blanks kept in a locked position by the respective grip elements.

Merely by way of example, the machining operations performed by the machine tool can be operations for flaring the end that lies opposite the bottom wall, cutting to size, edging and any dimensional checking of the finished part.

Traditionally, grip elements are constituted by an accommodation body that is associated with locking clamps mutually pivoted about an articulation axis that is substantially parallel to the rotation axis of the rotating table.

At least one of the two locking clamps operates on a cam that is mated with the fixed frame so that depending on the angular position of the locking element about the rotation axis of the rotating table with respect to the fixed frame, the locking clamps can move between an open release condition, in which the loading and unloading of the blank into and from the respective accommodation body is allowed, and a closed locking condition, in which the blank is locked inside the accommodation body so that it can be machined by the various machining spindles.

Although this solution is valid from a conceptual standpoint, it is however not free from drawbacks.

In particular, in view of the fact that the rotation axis does not coincide with the axis of the blank, an uneven pressure is observed on the body in addition to evident difficulties in format changing.

For solving the drawbacks of the device described above, grip elements have been proposed in which the locking of the container is ensured by an annular gasket or membrane, which is accommodated at the internal surface of the accommodation body.

Such membrane is accommodated between two outer rings, which are moved mutually closer or further apart as a consequence of the action of pneumatic springs which are connected, by means of a feed duct, to a device for injecting compressed air so as to move on command the rings between a spaced position, so that the membrane is in a release condition in which its inside diameter substantially corresponds to the inside diameter of the accommodation body, so as to allow the feeding and unloading of the containers, and a closer position, in which the membrane is moved into a locking condition in which the inside diameter of the gasket is smaller than that of the accommodation body, so as to lock stably the container accommodated therein.

However, even this constructive solution is not free from drawbacks.

If compressed air is injected in a preset angular position of the locking element, it is noted that in addition to a certain constructive complexity, which is due to the need to make the inlet of the supply duct match up with the delivery duct connected to the device for injecting compressed air, in case of machine downtime the escape of the air is frequent, with consequent transition of the gasket from the locking condition to the release condition.

In order to try to make the management of the injection of compressed air simpler and more reliable, solutions have been proposed in which the feed ducts connect the pneumatic springs directly to the device for injecting compressed air regardless of the angular position of the respective accommodation bodies. In this case it is indeed more effective to manage the transition of the gasket from the released condition to the locking condition, but this solution is difficult to provide on some types of rotating tables.

In another known solution, the locking of the container in the respective accommodation body is performed by using a membrane that can be deformed by means of the supply of a fluid, typically oil.

In this case also, various drawbacks are observed, including the escape of oil in the case of tears in the membrane.

The aim of the present invention is to solve the problems and obviate the drawbacks cited above, by providing a grip device for locking cylindrical metallic bodies destined for machining by means of machine tools that is extremely reliable in use.

Within this aim, an object of the invention is to provide a grip device for locking metallic bodies that has competitive production costs, so as to make its use advantageous also from the economic viewpoint.

This aim, as well as these and other objects that will become more apparent hereinafter, are achieved by a grip device for locking metallic bodies according to the provisions of claim 1.

Further characteristics and advantages of the invention will become more apparent from the description of some preferred but not exclusive embodiments of a grip device for locking metallic bodies according to the invention, illustrated by way of non-limiting example in the accompanying drawings, wherein.

Figure 1:
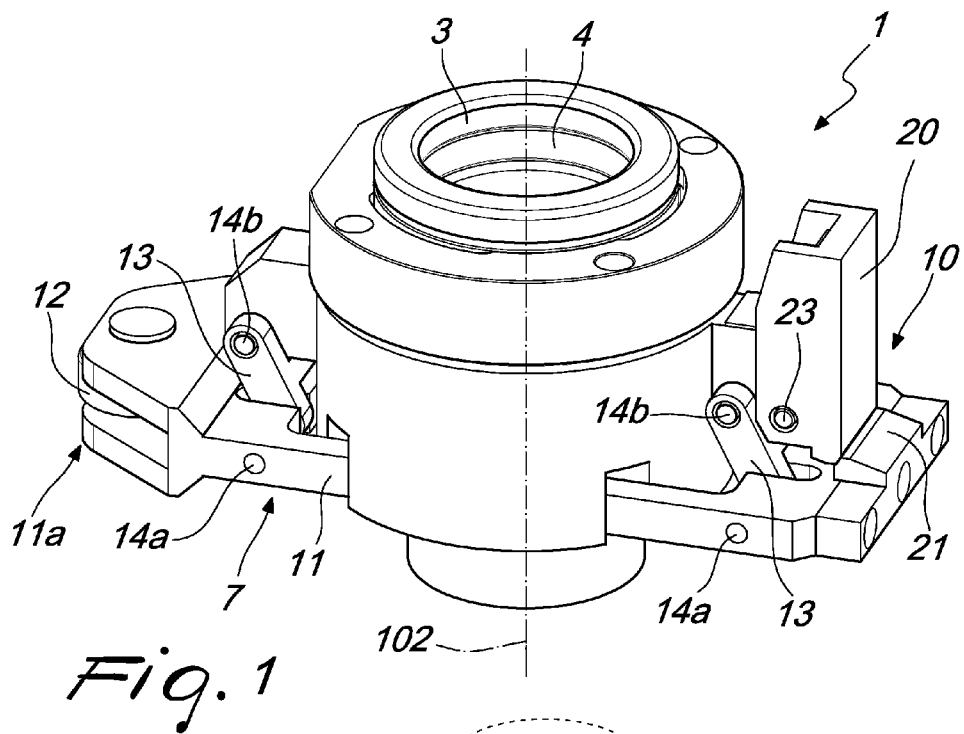
FIG. 1 is a perspective view of a grip device in the release position.

In the exemplary embodiments that follow, individual characteristics, given in relation to specific examples, may actually be interchanged with other different characteristics that exist in other exemplary embodiments.

The present invention relates to a grip device, generally designated by the reference numeral 1, for locking metallic bodies destined for machining by means of machine tools.

The grip device 1 comprises at least one accommodation body 3 for the bottom of a cylindrical container 2.

In particular, the accommodation body 3 is supported by a table that can move with respect to a supporting frame (both not shown in the figures).

The accommodation body 3 accommodates an annular membrane 4, which has at least one portion 4a that can be deformed radially.

The annular membrane 4 is associated, on opposite sides with respect to the deformable portion 4a, with a respective presser body 5a, 5b.

Figure 2:
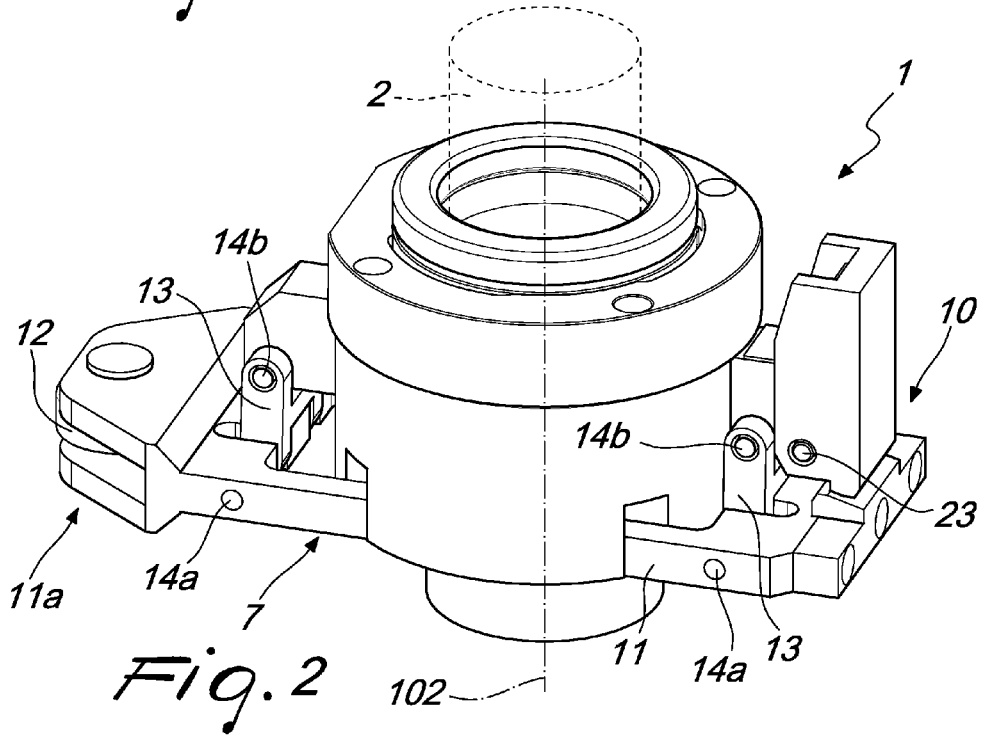
FIG. 2 is a perspective view of the grip device in the locking condition.
Figure 3:
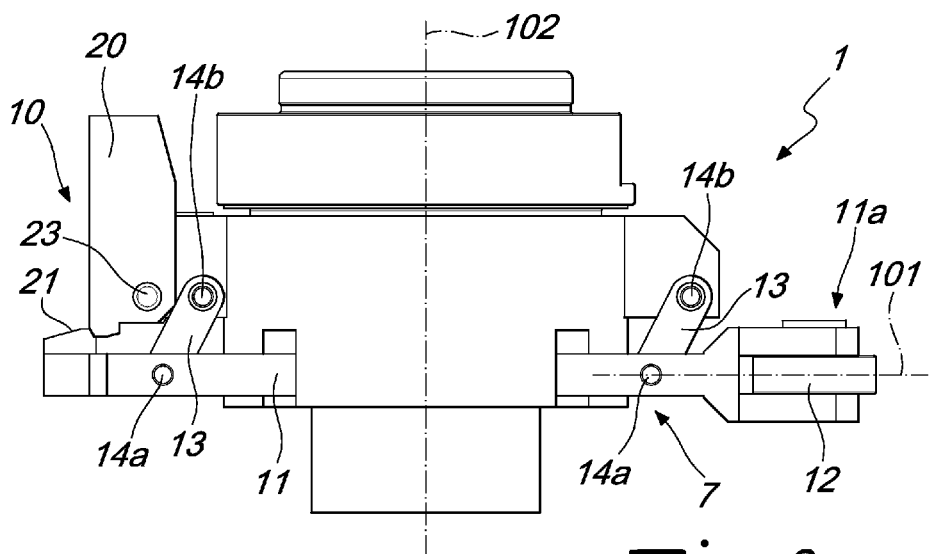
FIG. 3 is a side elevation view of the grip device in the release position.
Figure 4:
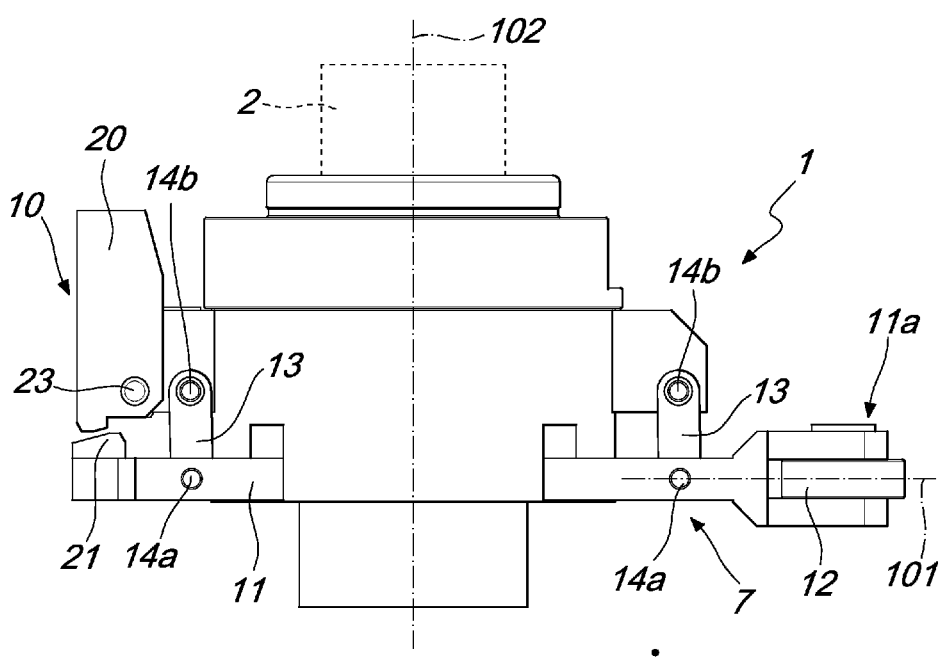
FIG. 4 is a side elevation view of the grip device in the locking position.

The grip device 1 is further provided with actuation means, generally designated by the reference numeral 6, which are adapted to move the presser bodies 5a, 5b on command mutually closer and apart to cause the transition of the annular membrane 4 between a locking position (shown in FIGS. 2, 4 and 6) and a release position (shown in FIGS. 1, 3 and 5) of a respective cylindrical container 2 and vice versa.

Specifically, when the presser bodies 5a, 5b move to a mutually closer position, they compress the deformable portion 4a of the annual membrane 4, making it "splay" in a radial direction inward, so as to allow the locking of the cylindrical container 2 accommodated within the accommodation body 3, whereas when the presser bodies are in a mutually spaced position the deformable portion 4a of the annular membrane 4 is extended, increasing its radial dimension and allowing accordingly the supply and discharge of the cylindrical container 2 to and from the accommodation body 3.

According to the present invention, the actuation means 6 comprise mechanical means 7 for kinematic transmission, which can be actuated as a consequence of the relative movement of the movable table with respect to the supporting frame.

According to a preferred embodiment, the actuation means 6 comprise at least one elastic loading body 8, constituted advantageously by a respective spring, which acts between the presser bodies 5a, 5b and is adapted advantageously to abut against respective abutment rings 9, 9b that are integral with the presser bodies 5a, 5b in order to keep the presser bodies 5a, 5b in a mutually closer position, so that the annular membrane 4 can remain in the locked position.

Figure 6:
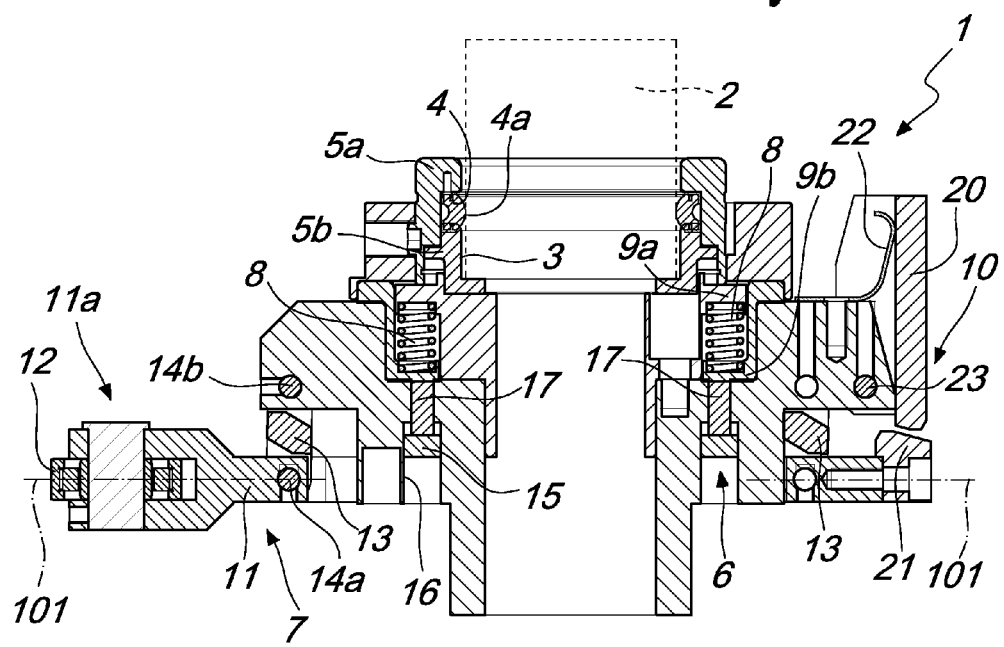
FIG. 6 is a sectional view of the grip device in the locking condition, taken along the plane of arrangement defined by the line VI-VI of FIG. 4.
Figure 7:
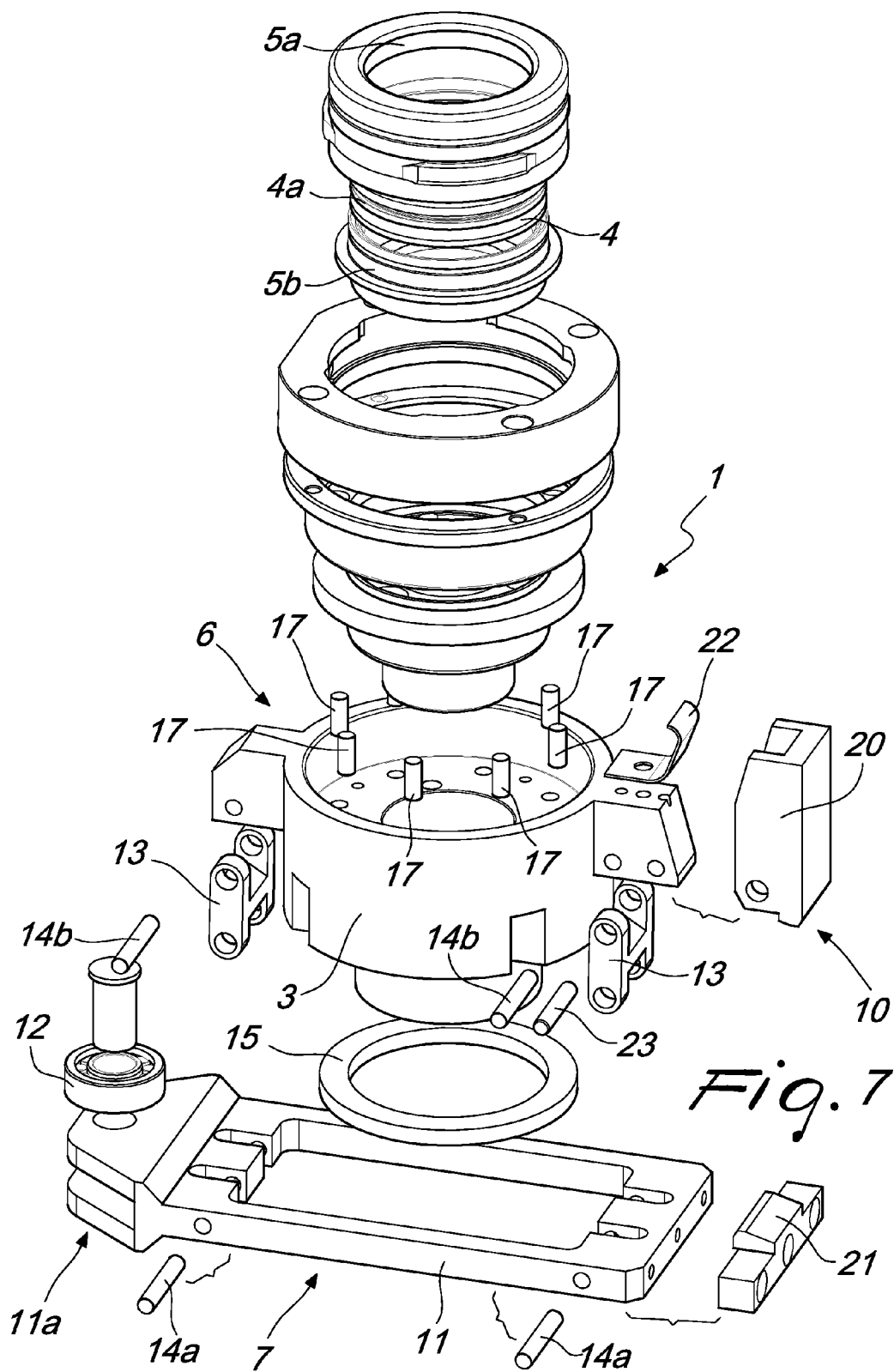
FIG. 7 is an exploded perspective view of the locking device according to the invention.

With reference to the sectional view of FIG. 6, it can be seen that this condition is provided with the elastic loading bodies 8 extended and therefore with the abutment rings 9a, 9b mutually spaced.

This constructive solution makes it possible to avoid stressing the elastic loading bodies 8 in the locking position, but of course the elastic loading body or bodies might be interposed directly between the presser bodies 5a, 5b, making the mechanical means for kinematic connection operate, in this case, on one of the two presser bodies 5a, 5b.

Again with reference to the embodiment shown in the figures, the mechanical means for kinematic transmission 7 are adapted to move, at at least one first preset relative position of the accommodation body 3 with respect to the supporting frame, at least one of the abutment rings 9b closer to the other abutment ring 9a in contrast to the action of the elastic loading body or bodies 9.

Figure 5:
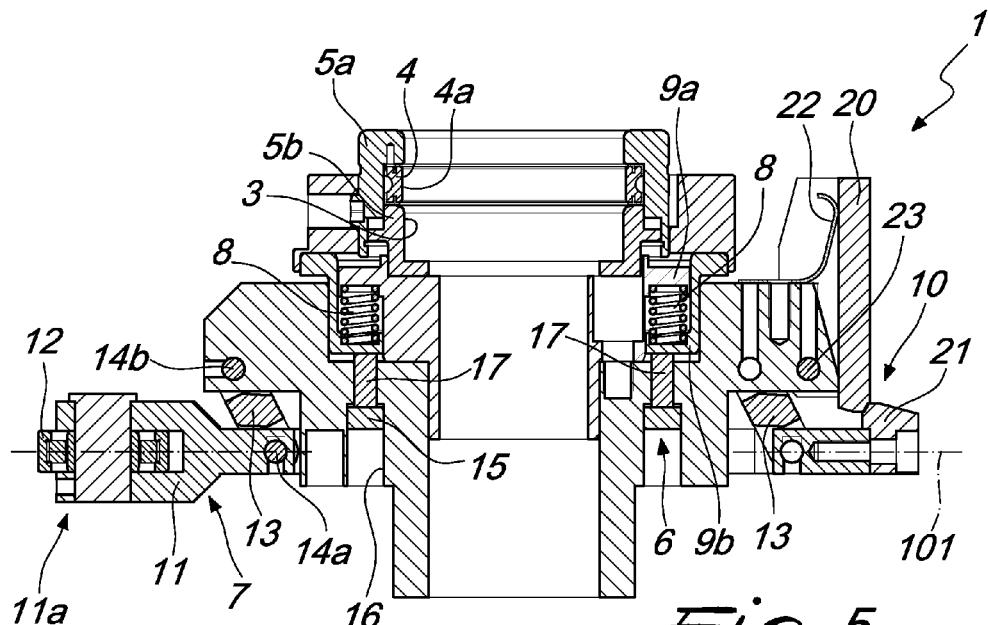
FIG. 5 is a sectional view of the grip device in the release condition, taken along the plane of arrangement defined by the line V-V of FIG. 3.

This action consequently causes the mutual spacing of the respective presser bodies 5a, 5b and the consequent transition of the annular membrane 4 from the locking position to the release position (FIG. 5).

Typically, the first preset relative position of the accommodation body 3 with respect to the supporting frame is arranged upstream of a station for unloading the cylindrical containers 2 subjected to the machining operations.

Advantageously, the actuation means 6 comprise a locking body 10, which is adapted to keep the abutment rings 9a, 9b mutually spaced, so as to keep the annular membrane 4 in the release position.

Specifically, the locking body 10, which is described in detail hereinafter, can be activated at the first preset position and can be deactivated at a second preset relative position of the accommodation body 3 with respect to the supporting frame: such second preset position is normally arranged downstream of a station for feeding the cylindrical containers 2 destined for machining.

It is further possible to provide means, which are optionally automatic, for deactivation of the locking body 10, which can be actuated on command or as a consequence of the detection of preset operating conditions.

In practice, as a consequence of the deactivation of the locking body 10, the elastic loading body or bodies 8 are adapted to return the abutment rings 9a, 9b to a mutually spaced position and accordingly the annular membrane 4 to the locking position.

The movable table can be constituted by a carousel which rotates, for example intermittently, with respect to the supporting frame about a rotation axis.

In this case, the grip device 1, or more advantageously a plurality of grip devices 1, are arranged at the peripheral region of the rotating carousel.

Conveniently, the mechanical means for kinematic connection 7 comprise a slider body 11, which is associated with a respective accommodation body 3 that is integral with the movable table.

The slider body 11 can be moved, as a consequence of the relative movement of the movable table with respect to the supporting frame, along a movement direction 101 that is substantially perpendicular to the longitudinal axis 102 of the accommodation body 3 thanks to the operation of an abutment body 12, conveniently constituted by a bearing whose rotation axis is parallel to the longitudinal axis 102, supported at one end 11a of the slider body 11 and able to slide against a contoured profile, not shown, that is formed on the supporting frame.

The slider body 11 is connected to the accommodation body 3 by means of at least one interconnection linkage 13, which is adapted to cause, as a consequence of the movement of the slider body 11 along the movement direction 101, a consequent movement along a direction that is substantially parallel to the longitudinal axis 102 of the accommodation body 3.

Conveniently, the connection between the slider body 11 and the accommodation body 3 is provided by means of two interconnection linkages 13, which are arranged on diametrically opposite sides with respect to the longitudinal axis 102 and are coupled rotatably to the slider body 11 and to the accommodation body about respective first and second pivots 14a, 14b that are arranged at right angles to the movement direction 101 and to the longitudinal axis 102.

The mechanical kinematic connection means 7 furthermore comprise a pusher body 15, which is advantageously annular and is associated with the slider body 11 so that it can move, together with the slider body 11, along a direction that is parallel to the longitudinal axis 101 but can slide, with respect to the slider body 11, along the movement direction 101.

The pusher body 15 furthermore can move within a sliding seat 16 that is formed in the accommodation body 3 so that it can move, a consequence of the movement of the slider body 11 along the movement direction 101, along a pushing direction that is substantially parallel to the longitudinal axis 102.

The mechanical kinematic connection means 7 are completed by a plurality of pusher pins 17 that are designed to transfer the movement from the pusher body 15 to the second abutment ring 9b in order to cause, as a consequence of the movement toward the cylindrical container 2 of the pusher body 15, an approach, in contrast to the action applied by the elastic loading bodies 8, of the second abutment ring 9b toward the first abutment ring 9a and the consequent transition of the annular membrane 4 from the locking position to the release position.

In order to distribute the thrust in a balanced manner among the presser bodies 5a, 5b, the actuation means 6 comprise a plurality of elastic loading bodies 8 that act between the presser bodies 5a, 5b and are arranged so as to be angularly mutually spaced about the longitudinal axis 102 of the accommodation body 3.

Merely by way of indication, the movable table is arranged opposite a machining assembly that supports a plurality of machining spindles destined to perform in sequence the machining operations on the cylindrical containers 2 kept in the locked position by the respective grip devices 1.

With reference to the embodiment shown in the figures, the locking body 10 can be constituted by a shoulder 20 that is pivoted to the accommodation body 3 about a pivot 23 and is kept in position by a loaded lamina 22.

The locking body 10 is completed by a locking tooth 21, which is integral with the slider body 11 and is destined (when the locking body 10 is activated, shown in the sectional view of FIG. 5) to press against an edge of the shoulder 20 until, as a consequence of the action of the deactivation means (which in this case cause a rotation of the shoulder 20 about the pivot 23), it does not allow the elastic loading bodies 8 to return the pusher body 15 to a position spaced from the cylindrical container 2 and consequently move the slider body 11.

The operation of a locking device 1 according to the invention is evident from what has been described above.

All the characteristics of the invention indicated above as advantageous, convenient or the like may also be omitted or be replaced with equivalents.

The invention thus conceived is susceptible of numerous modifications and variations, all of which are within the scope of the appended claims.

In practice it has been found that the invention has achieved the intended aim and objects in all of its embodiments.

In practice, the dimensions may be any according to requirements.

All the details may further be replaced with other technically equivalent elements.

The disclosures in Italian Patent Application no. VR2011A000229, from which this application claims priority, are incorporated herein by reference.

The invention claimed is:

1. A grip device for locking metallic bodies destined for machining by means of machine tools, comprising:
at least one accommodation body adapted to engage with a bottom of a cylindrical container, said at least one accommodation body adapted to be supported by a movable table;
an annular membrane extending from said at least one accommodation body, said annular membrane having at least one deformable portion that can be deformed in a radial direction inward to allow said at least one accommodation body to engage with said bottom of said cylindrical container, said annular membrane having a first side and a second side opposite said first side, said at least one deformable portion being between said first side and said second side;
a first presser body coupled to said first side of said annular membrane and a second presser body coupled to said second side of said annular membrane; and
a plurality of elastic loading bodies adapted to abut against a first abutment ring and a second abutment ring, wherein said first and second abutment rings are integral with said first and second presser bodies, respectively;
wherein said at least one accommodation body is adapted such that relative movement of said movable table is adapted to move said first and second presser bodies closer together and further apart, to cause a transition of said annular membrane between a locking position and a release position, respectively.

2. The grip device according to claim 1, wherein said plurality of elastic loading bodies are adapted to keep said first and second abutment rings mutually spaced.

3. The grip device according to claim 1, wherein said at least one accommodation body is adapted such that relative movement of said movable table is adapted to move, in at least one first preset relative position of said at least one accommodation body, at least one of said first and second abutment rings toward the other abutment ring in contrast to an action applied by said plurality of elastic loading bodies.

4. The grip device according to claim 3, wherein said locking body can be deactivated in a second preset relative position of said at least one accommodation body, following the deactivation of said locking body said plurality of elastic loading bodies adapted to return said first and second abutment rings to a mutually spaced position and consequently said annular membrane to the locking position.

5. A grip device for locking metallic bodies destined for machining by means of machine tools, comprising:
at least one accommodation body adapted to engage with a bottom of a cylindrical container, said at least one accommodation body adapted to be supported by a movable table;
an annular membrane extending from said at least one accommodation body, said annular membrane having at least one deformable portion that can be deformed in a radial direction inward to allow said at least one accommodation body to engage with said bottom of said cylindrical container, said annular membrane having a first side and a second side opposite said first side, said deformable portion being between said first side and said second side;
a first presser body coupled to said first side of said annular membrane and a second presser body coupled to said second side of said annular membrane; and
a locking body which is adapted to keep said first and second presser bodies in a mutually spaced condition such that said annular membrane remains in a release position;

wherein said at least one accommodation body is adapted such that relative movement of said movable table is adapted to move said first and second presser bodies closer together and further apart, to cause a transition of said annular membrane between a locking position and a release position, respectively.

6. The grip device according to claim 5, wherein said locking body in an activated position is adapted to keep a first abutment ring and a second abutment ring mutually closer in contrast to an action of a plurality of elastic loading bodies.

7. A grip device for locking metallic bodies destined for machining by means of machine tools, comprising:
- at least one accommodation body adapted to engage with a bottom of a cylindrical container, said at least one accommodation body adapted to be supported by a movable table;
- an annular membrane extending from said at least one accommodation body, said annular membrane having at least one deformable portion that can be deformed in a radial direction inward to allow said at least one accommodation body to engage with said bottom of said cylindrical container, said annular membrane having a first side and a second side opposite said first side, said deformable portion being between said first side and said second side;
- a first presser body coupled to said first side of said annular membrane and a second presser body coupled to said second side of said annular membrane; and
- a slider body which is associated with said at least one accommodation body, said slider body being movable, following relative movement of said movable table, along a direction of motion which is substantially perpendicular to a longitudinal axis of said at least one accommodation body;
- wherein said at least one accommodation body is adapted such that relative movement of said movable table is adapted to move said first and second presser bodies closer together and further apart, to cause a transition of said annular membrane between a locking position and a release position, respectively.

8. The grip device according to claim 7, wherein said slider body supports a pusher ring which can move, as a consequence of the movement of said slider body along the respective movement direction, along an actuation direction that is substantially parallel to said longitudinal axis.

9. A grip device for locking metallic bodies destined for machining by means of machine tools, comprising:
- at least one accommodation body adapted to engage with a bottom of a cylindrical container, said at least one accommodation body adapted to be supported by a movable table;
- an annular membrane extending from said at least one accommodation body, said annular membrane having at least one deformable portion that can be deformed in a radial direction inward to allow said at least one accommodation body to engage with said bottom of said cylindrical container, said annular membrane having a first side and a second side opposite said first side, said deformable portion being between said first side and said second side;
- a first presser body coupled to said first side of said annular membrane and a second presser body coupled to said second side of said annular membrane; and
- a plurality of elastic loading bodies which act between said first and second presser bodies and are arranged so as to be mutually angularly spaced around a longitudinal axis of said at least one accommodation body;
- wherein said at least one accommodation body is adapted such that relative movement of said movable table is adapted to move said first and second presser bodies closer together and further apart, to cause a transition of said annular membrane between a locking position and a release position, respectively.

* * * * *